June 24, 1941.    W. T. JONES ET AL    2,247,090
VALVE
Filed June 30, 1939

Inventors:
William T. Jones,
Dennis J. Connelly
by Roberts Cushman Woodberry
Attys.

Patented June 24, 1941

2,247,090

UNITED STATES PATENT OFFICE 2,247,090

VALVE

William T. Jones, Newton, and Dennis J. Connelly, Randolph, Mass., assignors to Barnes & Jones, Incorporated, Jamaica Plain, Mass., a corporation of Massachusetts Application June 30, 1939, Serial No. 282,118

7 Claims. (Cl. 251—153)

This invention pertains to valves primarily intended for use in controlling the supply of heating fluid, for instance, steam or hot water, to a radiator or equivalent device, and relates more especially to a valve of the orifice type which at a "full open" setting of the valve-actuating handle is designed to admit heating fluid at the available supply pressure in an amount accurately corresponding to the maximum condensing capacity of the radiator under normal service conditions.

In low pressure steam heating practice it is well known that an orifice of fixed size or area has a definite capacity at a given pressure differential. This capacity may be changed by varying the pressure differential across the orifice, and therefore, if the pressure differential be changed, the amount of steam delivered to the radiators in a building is correspondingly varied. Such a change in the pressure differential may be made in order to adapt the steam to different conditions of heat loss from the building. On the other hand, the maximum amount of steam which will be delivered to any individual radiator at a given pressure differential depends upon the size of the inlet orifice or its equivalent, of each radiator. Thus not only must each radiator in the system be provided at installation with an inlet orifice calculated upon the basis of the normal pressure differential for which the system is designed, but it may become necessary to change the orifice capacity of individual radiators if at any time a different pressure differential should be established in the system.

In certain instances, such for example as a residence where steam is supplied at a normal pressure of four pounds, it is frequently desirable to modulate, that is to say only partially heat, some of the radiators. But with prior available equipment it has been very difficult accurately to graduate the amount of steam admitted to a given radiator so that by the mere actuation of a valve handle the user could be certain of heating the radiator to a definite percentage of its maximum capacity.

It is manifest that in designing a radiator control valve it is highly desirable that it be so constructed as to be useful with radiators of a wide range of capacity. On the other hand, if a valve designed for a relatively large radiator, for instance, a hundred foot radiator, be reset to supply a radiator of small capacity, for instance, a ten foot radiator, the orifice, at a full open setting of the handle would be quite small, and thus the angular motion of the handle in moving from full open to closed position would ordinarily be small, for instance 15°. To the average person, uninitiated in the design of such a valve, so small a movement of the handle might seem wholly inadequate and cause him to believe that the valve was stuck and thus he might be led to apply force sufficient to distort or break the parts in the effort to obtain a greater movement of the handle.

There are available on the market what are commonly termed "adjustable orifices" so arranged that by disconnecting the union nuts of the supply valves or some similar operation, the orifice device may be reached and its adjustment changed as desired. However, when the valves are connected to the radiators under operating conditions, such orifice devices have no visual means of indicating their capacities, and in order to examine them it is necessary to disconnect some of the parts, and even after they have been disconnected it is not always easy to determine by inspection whether the orifice area is of the exact size to meet the requirements. Any such changes in adjustment of the orifice should be made by a person trained in the work if proper results are to be obtained, but unauthorized or incompetent persons sometimes make improper adjustments in the orifices of such valves with serious consequences to the operation of the heating system. Such improper adjustments, especially when the radiator in question is one of a large number, are often difficult and costly to locate, and if not corrected may impair the operation of the system and cause a substantial waste of heat.

A principal object of the invention is to provide an orifice type valve designed to have an orifice aperture of a maximum capacity such that the valve may be used with a radiator of large size but comprising orifice-varying means readily accessible from the outside of the valve casing and so devised as to permit accurate reduction of the effective size of the orifice aperture so as to adapt the valve for use with radiators of smaller sizes.

A further object of the invention is to provide orifice-varying means accessible from outside the radiator casing and comprising a graduated dial and pointer so designed that the orifice may readily be adjusted by the user from the full open position to which it has initially been set at installation, to the full closed position, and in such a way that at any intermediate setting the pointer will accurately indicate the percentage of full normal capacity at which the user has adjusted the valve.

A further object is to provide a valve of the orifice type so designed that although the orifice may be set to a small maximum capacity (so that a small angular movement of the valve handle would ordinarily suffice to adjust the valve from full open to closed position) the valve handle must actually be moved through a much greater arc, a portion of the movement being idle. Thus the user will have no occasion to believe that the valve is stuck or out of order.

A further object of the invention is to provide means comprising an adjustable dial and a limit stop so designed and relatively adjustable that in installing the valve the dial and stop may be used in setting the valve parts to correspond to the capacity of the radiator with which the valve is to be associated, and so that at maximum opening of the valve it will supply an amount of heating fluid at the available pressure differential corresponding to the maximum condensing capacity of the radiator, the dial and stop being always in readiness and available for use in re-setting the orifice to a different maximum capacity if it should afterward become necessary to do so.

A further object is to provide an arrangement in which such subsequent settings of the maximum capacity of the valve may be made by the ordinary attendant and without disconnecting the valve parts, and so that after the maximum working capacity has been determined, the setting is visibly indicated so that improper setting may quickly and easily be detected.

Other and further objects and advantages of the invention will be pointed out hereinafter in the following more detailed description and by reference to the accompanying drawing, in which Fig. 1 is a fragmentary plan view of the improved valve, showing the handle in the full shut position, the valve orifice being set to correspond to substantially a fifty-foot radiator;

Figure 6:
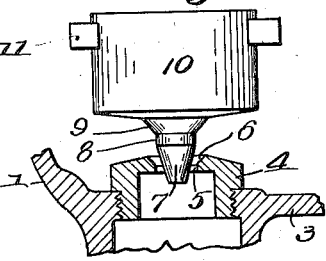
Fig. 6 is a view similar to Fig. 5 but showing the orifice and valve head positioned corresponding to the setting of the handle as indicated in Fig. 3.

Referring to the drawing the numeral 1 designates the casing of the valve, such casing being of a type commonly used for radiator inlet valves and having the internally screw-threaded inlet portion 2 and the externally screw-threaded outlet portion 3 which ordinarily receives a tail piece connected to the valve casing by a union nut. At the upper end of the inlet passage there is provided an orifice member 4, shown as having screw-threaded engagement with the casing, such orifice member having the orifice opening 5 and preferably having the beveled valve seat 6 (Fig. 6) coaxial with the orifice opening. This orifice opening 5 is of sufficient area to admit heating fluid (supplied at the normal pressure differential) to heat the largest radiator with which the valve is designed to be associated.

The effective area of the orifice 5 is determined by a valve head which preferably comprises the tapered portion 7, the substantially cylindrical portion 8, and the beveled portion 9. The cylindrical portion 8 is of such a diameter that when it enters the orifice 5 the latter is completely closed to the passage of fluid. The beveled portion 9 of the valve head has the same slope as the valve seat 6 and when in engagement with the latter provides further insurance against the passage or leakage of pressure fluid through the orifice.

The valve head just described is carried by and, as here shown, is integral with a cup-like member 10 provided with guiding ears 11 arranged to move in vertical, diametrically disposed slots 12 in the depending cylindrical skirt portion 12ª of the valve bonnet 13. This valve bonnet is screw-threaded for engagement with internal threads at the upper part of the casing 1, and as here shown is furnished with an upstanding externally screw-threaded nipple 14 which forms the upper part of a stuffing box designed to receive suitable packing material 15 embracing the valve stem 16. The valve stem extends downwardly through the bonnet 13 into the upper part of the valve casing where it is furnished with an enlargement 17 externally screw-threaded at 18 for engagement with internal screw threads at the upper part of the cup-like member 10. Preferably the screw threads at 18 are of multiple pitch so that the valve head may be moved from full open to full closed position by less than a complete turn of the valve stem.

An actuating handle H is secured to the upper end of the stem 16 and is furnished with a pointer or index member 19 which has the two-fold function of acting as an indicator to show the degree to which the valve is open during use and also as a limit element to cooperate with a stop to determine the maximum capacity of the valve when associated with a given radiator.

A circular dial support 20 is arranged above the bonnet 13. This dial support has an internally screw-threaded annular boss 21 having threaded engagment with the nipple portion 14 of the bonnet. The dial support also has the annular cap portion 22 through which the upper end of the stem passes and which forms a guide for the stem and which also houses a compression spring 23 which bears upon the packing material 15 in the stuffing box. The dial support also includes the wide, horizontal radial flange 24 having the annular upper surface 25,—the annular upper surface 26 disposed at a slightly higher level than and concentric with the surface 25, and the narrow annular rim 27. The dial support 20 may be fixed in adjusted position by means of a lock nut 28 which bears against the upper surface of the bonnet 13 and which has screw-threaded engagement with external threads on the boss 21, while a second lock nut 30, engaging external threads on the part 29, is designed to fix the dials in adjusted position.

Figure 4:
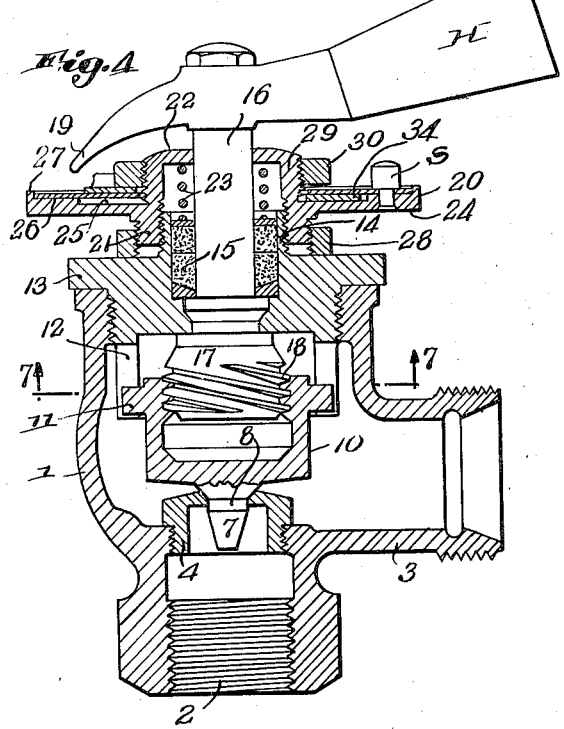
Fig. 4 is a vertical section, to somewhat larger scale, with the parts positioned in the same way as in Fig. 1.

The stop supporting dial 31 (Fig. 8) is an annulus of thin metal of an external diameter such as to fit just within the rim 27 of the dial support and to rest upon the surface 26, the upper surface of this dial member being just below the upper edge of the rim 27. This stop supporting dial is furnished with a segmental slot 31ª defined by the radial surfaces 32 and 33 and is preferably provided adjacent to the surface 32 with some indication, for example, the word "open" to designate the full open operative position of the valve. Adjacent to this edge 32 there is provided the stop pin or lug S which is fixed to the dial member 31 and which, as illustrated in Fig. 4, may also extend down through the dial support 20 so as to secure the dial 31 to the latter. The graduated dial 34 (Fig. 9) is also a sheet metal annulus of substantially the same radial dimensions as the surface 25 of the dial support and having a segmental aperture 35 defined by radial edges 36 and 37. A portion of the metal may be turned up as indicated at 36ª to form a thumb piece for turning the graduated dial. Adjacent to this thumb piece the dial is provided with some indicating character, for example the word "shut" to indicate the full shut position of the valve handle, and a special graduation mark 38 may be placed in proper relation to this index character or designation. The graduated dial is also furnished with a series of graduations 39 which may be numbered from zero up to the highest capacity of radiator for which the valve is designed. Thus as shown in Fig. 9, the graduations read from 0 to 100 with the understanding that the valve may be used with radiators up to 100 feet capacity. Preferably the zero graduation is spaced from the stop indication 38 a distance of from 45° to 90°, while the upper graduation 100 is preferably spaced from the edge 37 a distance such that there will be no danger of accidental disassembly of the dials when the valve is set to maximum capacity. When the dials are assembled, that portion of the dial 34 which intervenes between the edge 37 and the uppermost selected graduation, lies beneath the inner part of the dial member 31 and within the annular channel defined by the surface 25 and the lower surface of the dial 31.

To set this valve for use with a given radiator the procedure is substantially as follows, it being understood that the dial 34 has been assembled with the dial 31, the latter resting upon the dial support 20; that the end portion 35 of the dial 34 has been slipped down beneath the edge 32 of the dial 31 so as to lie in the annular channel beneath the dial 31 and that the lock nuts 28 and 30 have both been loosened. If it now be assumed that the valve is to be used with a radiator of 50 foot size, the person installing the valve first turns the handle H in a clockwise direction until the surface 9 of the valve head is seated against the seat surface 6, that is to say, until the stem can no longer be turned in the closing direction. The corresponding position of the valve head is indicated in Fig. 4. The operator now slides the graduated dial 34 relative to the stop-carrying dial until the closed graduation 38 lies immediately beneath the pointer 19 and then he turns the dial 31 in a clockwise direction until the edge 32 of the gap 31ª substantially coincides with the graduation marked 50, it being noted that during such movement of the dial 31, the dial 34 must always be kept so that the graduation mark 38 remains beneath the pointer 19. Thereupon the lock nuts 28 and 30 are tightened so as to retain the parts in this predetermined relative position corresponding to a 50 foot radiator. With the parts so set and the movement of the valve handle limited to the arc determined by the engagement of the finger 19 with the stop lug or pin S, it is impossible to move the valve head upwardly to a point beyond that at which the proper amount of steam (at the normal pressure differential) will be delivered to a 50 foot radiator. In other words, no more steam can be admitted to the 50 foot radiator than can be condensed by the latter under the normal working conditions. On the other hand, since the graduation 50 has been set to come opposite to the stop pin S, a mere inspection of the valve when in use will indicate at once that the valve parts are properly set for a 50 foot radiator and if any unauthorized person should thereafter tamper with the valve so as to change its working capacity, an inspector can tell at a glance that this has been done merely by reference to the exposed graduations on the dial 34. In this connection it may be noted that all of the graduations of this dial above the maximum selected graduations to correspond to the given radiator are concealed from view when the valve has once been set so that there is no possibility of mistaking the actual setting of the valve in observing the graduations.

In accordance with this invention it is proposed so to taper the part 7 of the valve head with reference to the pitch of the screw threads 18, that as the tapered part 7 of the head moves up and down in the orifice aperture 5, the effective area of the orifice will vary in exact proportion to the angular movement of the valve stem. With this arrangement the movement of the pointer 19 over the exposed graduated portion of the dial (after the valve has once been set for use with a given radiator) will directly indicate to the user what proportion of full capacity is in use. Thus, if, as illustrated, the valve be set for a 50 foot radiator and the valve pointer 19 be swung so as to coincide with the graduation marked 25, the user is assured that steam sufficient to modulate the heating to one-half the maximum capacity is being admitted.

Figure 1:
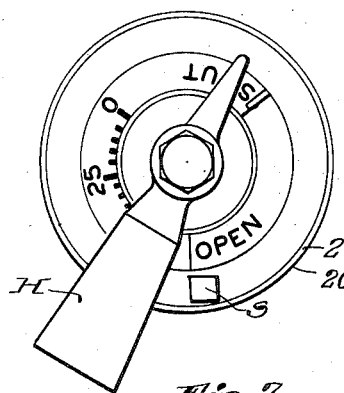
Figure 2:
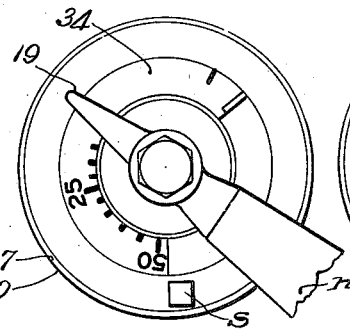
Fig. 2 is a view similar to Fig. 1 but showing the handle as having been moved to the point at which the valve orifice begins to open.
Figure 3:
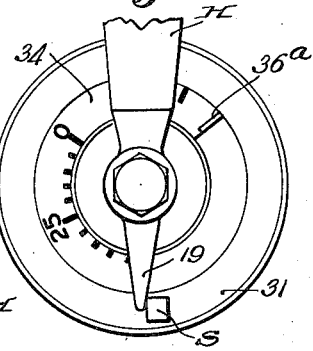
Fig. 3 is a view similar to Figs. 1 and 2 but showing the handle at the full open position.
Figure 7:
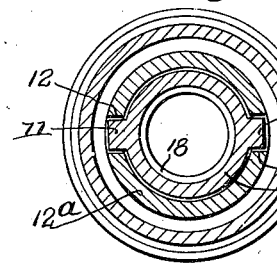
Fig. 7 is a section to smaller scale on the line 7—7 of Fig. 4.
Figure 5:
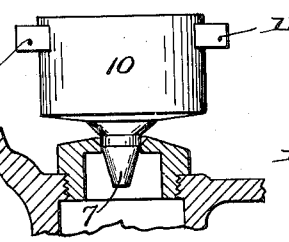
Fig. 5 is a fragmentary vertical section, partly in elevation, showing the valve head and orifice in the relative positions which they occupy when the handle is in the position of Fig. 2.

Assuming that the valve has been installed and set as above described and that the valve handle occupies the position shown in Fig. 1 with the valve head in the position shown in Fig. 4, and that the user wishes to admit steam to the radiator, the handle H is swung in a counterclockwise direction so that the pointer moves from the full shut graduation 38 toward the zero point of the scale. During this movement the beveled surface 9 of the valve head leaves the seat 6, but the cylindrical portion 8 of the valve head turns freely within the orifice 5, but, as it substantially fills the orifice, little, if any, pressure fluid is permitted to enter the radiator. As the handle continues to move in this direction the cylindrical portion 8 rises until the pointer 19 reaches the graduation marked 0. At this instant, as illustrated in Fig. 5, the lower edge of the cylindrical portion of the valve head has just reached the plane of the lower edge of the beveled seat surface 6. Thereafter, as the handle continues to move in the counterclockwise direction and the pointer 19 sweeps over the graduated scale, the tapered part 7 of the valve head moves upwardly in the orifice 5 and provides a progressively increasing orifice area through which the pressure fluid may flow. Since the taper of the part 7 bears a definite ratio to the pitch of the threads 18, the movement of the pointer 19 from graduation to graduation of the scale indicates a corresponding progressive opening of the orifice from the effective shut position of the valve head (corresponding to the zero graduation) to the full open operating position reached when the pointer engages the stop pin S. In the latter position the valve is passing just sufficient steam to fill the given radiator to full capacity under the normal pressure differential.

It will be evident from the above description that if it become necessary at any time during the use of the valve to change its maximum working capacity, for example if for some reason it is desired to provide an excess of steam for a particular radiator, it is only necessary, in order that the valve capacity may be varied, to loosen the nuts 28 and 30, and to reset the dials 31 and 34 to correspond to this new maximum working capacity of the valve. It is not necessary to dismantle the valve or disconnect it from the radiator or to remove and replace any parts, and since the new setting is indicated clearly and accurately by the graduations on the dial 34, it does not require a skilled operator to reset the valve. On the other hand its proper setting is always observable by anyone who cares to inspect it, merely by noting whether the dial setting is the proper one for the conditions to be cared for.

Figure 8:
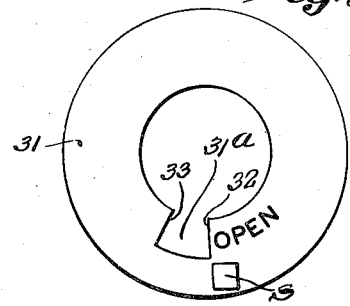
Fig. 8 is a plan view of the stop supporting dial.
Figure 9:
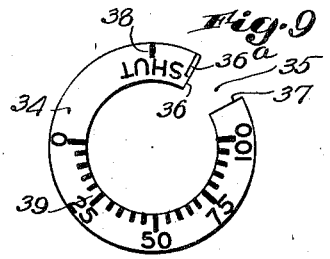
Fig. 9 is a plan view of the graduated dial.

While the dial arrangement specifically shown in Figs. 8 and 9 is preferred, since with such an arrangement it is possible to make use of a large portion of the dial member 34 for the graduations as well as for the idle portion of the dial between the zero point and the stop graduation 38, the invention is not necessarily limited to the use of such complemental dials but is to be understood as inclusive of other dial arrangements whereby the same general effect may be secured.

It has been noted that during the opening of the valve the pointer 19 moves from the full shut indication 38 to the zero graduation without any useful function so far as opening the valve is concerned, but this idle movement is useful, particularly when the valve has been set for a radiator of very low capacity, in order to give the operator the psychological satisfaction of moving the valve handle a substantial amount, thus to make him feel that the valve is actually operating and has not become stuck or incapacitated even though a very short motion of the handle is necessary to move the valve head from the full open working position to the full shut position when the valve is used with a radiator of very small capacity, for example a 10 foot radiator. While this arrangement, providing for lost motion of the handle is desirable, and while such lost motion may be provided in other and equivalent ways than that here illustrated, it is to be understood that such lost motion is not essential, since the valve and its dial will function, so far as actual opening and closing is concerned, just as well without provision for such lost motion. However, for the reason stated the idle movement of the handle is desirable and useful.

The embodiment of the invention here illustrated by way of example is simple, durable and inexpensive and is regarded as the preferred construction, but it is to be understood that the invention is not necessarily limited to the precise details herein disclosed but is broadly inclusive of all equivalent constructions such as fall within the appended claims.

We claim:

1. An orifice-type valve designed for use with radiators of different sizes, said valve having a casing, a part provided with an orifice, and means operative to change the effective area of the orifice including a valve-actuator handle, an adjustable stop element cooperable with said handle and operative to limit movement of the latter in the area-increasing direction, said stop element being fixed to a rotary, normally stationary dial, said dial having a radial slot therethrough adjacent to the stop element, a graduated dial in the form of a partial annulus of smaller diameter than the stop-carrying dial and concentric with the latter, said graduated dial lying partly above and partly below the stop-carrying dial, the graduated dial having a series of graduations operative to indicate the proper location of the stop element to correspond to a radiator of a given size, that portion of the graduated dial having the graduations which correspond to larger size radiators than that selected being concealed beneath the stop-carrying dial.

2. An orifice-type radiator valve of variable full-open capacity, said valve having a rotatable actuating handle and a stop element cooperable with the handle to limit opening movement of the latter to a definite amount corresponding to the needs of the radiator with which the valve is associated, the valve parts being so designed and arranged that the valve-actuating handle may move through an arc of the order of 90° between closed and full-open position even with the valve set for minimum full-open capacity.

3. An orifice-type radiator valve of variable full-open capacity, said valve having a rotatable actuating handle and a stop element cooperable with the handle to limit opening movement of the latter to a definite amount corresponding to the needs of the radiator with which the valve is associated, the valve comprising a movable head cooperable with an orifice to vary the capacity of the valve, and means for transmitting movement of the handle to the head, the parts being so designed and arranged as to permit a substantial movement of the actuating handle in the closing direction after the head has reached full closing position.

4. An orifice-type radiator valve of variable full-open capacity, said valve having a rotatable actuating handle and a stop element cooperable with the handle to limit opening movement of the latter to a definite amount corresponding to the needs of the radiator with which the valve is associated, the valve comprising a part having an orifice opening therein, a movable head cooperable with the orifice opening to vary the effective size of the latter, and a rotatable valve stem for moving the valve head, the orifice and head being so designed and arranged that the effective area of the orifice varies in exact proportion to the angular movement of the stem, and means for transmitting movement of the handle to the head, the parts being so designed and arranged that the handle may be freely moved a substantial distance in the closing direction after the head has fully closed the orifice opening.

5. An orifice-type radiator valve of variable full-open capacity, said valve having a rotatable actuating handle and a stop element cooperable with the handle to limit opening movement of the latter to a definite amount corresponding to the needs of the radiator with which the valve is associated, the valve comprising a movable head which cooperates with an orifice to vary the effective size of the latter, and means for transmitting movement of the handle to the head, the valve head comprising a tapered part which cooperates with the orifice so as gradually to close the latter as the handle is moved in the closing direction, the head also including a cylindrical portion which enters the orifice after the orifice is completely closed and which moves axially as the handle continues to turn if the handle be moved beyond the effective closing point.

6. An orifice-type radiator valve of variable full-open capacity, said valve having a rotatable actuating handle and a stop element cooperable with the handle to limit opening movement of the latter to a definite amount corresponding to the needs of the radiator with which the valve is associated, the valve comprising a part having an orifice therein and a movable head cooperable with the orifice to vary the effective area of the latter, and means for transmitting movement of the handle to the head, the head having a tapered portion which cooperates with the orifice as the handle is moved toward closing position so as gradually to restrict the orifice, the head having a cylindrical extension at the larger end of its tapered portion, said extension being of such diameter as to have a snug sliding fit within the orifice, said cylindrical extension moving axially of the orifice after the latter is closed if the movement of the handle be continued in the closing direction.

7. An orifice-type valve of variable full-open capacity and designed for use with radiators of different sizes and for different pressure differentials, said valve having a rotatable handle and a stop element cooperable with the handle to limit opening movement of the latter to a definite amount corresponding to the needs of the radiator with which the valve is associated, said stop element being fixed to an adjustable dial, and a graduated dial concentric with the stop-carrying dial and angularly adjustable with respect both to the latter and to the casing, said graduated dial having graduations operative to indicate the proper location of the stop element to correspond to a radiator of a given size, no graduation higher than that corresponding to said given size of radiator being exposed to view during use, the parts being so designed and arranged as to permit a substantial movement of the actuating handle in the closed direction after the head has reached full closing position.

WILLIAM T. JONES.
DENNIS J. CONNELLY.